(12) United States Patent
Besen et al.

(10) Patent No.: US 10,433,630 B2
(45) Date of Patent: Oct. 8, 2019

(54) COSMETIC APPLICATOR SYSTEM INCLUDING TRACKABLE COSMETIC DEVICE, AND CLIENT DEVICE TO ASSIST USERS IN MAKEUP APPLICATION

(71) Applicant: L'OREAL, Paris (FR)

(72) Inventors: Rich Besen, Clark, NJ (US); Maya Kelley, San Francisco, CA (US); Guive Balooch, Clark, NJ (US); Yves Behar, San Francisco, CA (US); Qin Li, San Francisco, CA (US); Ilgu Cha, San Francisco, CA (US)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 15/863,397

(22) Filed: Jan. 5, 2018

(65) Prior Publication Data
US 2019/0208892 A1  Jul. 11, 2019

(51) Int. Cl.
| | |
|---|---|
| G06F 3/048 | (2013.01) |
| A45D 40/18 | (2006.01) |
| G06F 3/01 | (2006.01) |
| H04M 1/725 | (2006.01) |
| A46B 9/02 | (2006.01) |
| G06F 3/16 | (2006.01) |
| G06T 19/00 | (2011.01) |

(52) U.S. Cl.
CPC .............. *A45D 40/18* (2013.01); *A46B 9/021* (2013.01); *G06F 3/016* (2013.01); *G06F 3/017* (2013.01); *G06F 3/167* (2013.01); *G06T 19/006* (2013.01); *H04M 1/7253* (2013.01); *A45D 2200/10* (2013.01); *A46B 2200/1046* (2013.01)

(58) Field of Classification Search
CPC ......... A45D 40/18; A46B 9/021; G06F 3/016; G06F 3/017; G06F 3/167; G06T 19/006; H04M 1/7253
USPC ......................................................... 715/863
See application file for complete search history.

(56) References Cited

U.S. PATENT DOCUMENTS

| | | | | |
|---|---|---|---|---|
| 8,007,062 | B2* | 8/2011 | Edgar | A61B 5/0064 347/1 |
| 9,122,320 | B1* | 9/2015 | Rowles | G06F 3/0317 |
| 9,671,872 | B2* | 6/2017 | Bai | G06F 3/017 |
| 2010/0026831 | A1* | 2/2010 | Ciuc | G06K 9/00221 348/222.1 |
| 2010/0185064 | A1* | 7/2010 | Bandic | A61B 5/0059 600/306 |
| 2013/0300761 | A1* | 11/2013 | Ahmed | G01J 3/463 345/595 |
| 2013/0329079 | A1* | 12/2013 | Florea | G06K 9/00221 348/222.1 |

(Continued)

FOREIGN PATENT DOCUMENTS

EP 2 889 723 A1 7/2015

*Primary Examiner* — David Phantana-angkool
(74) *Attorney, Agent, or Firm* — Oblon, McClelland, Maier & Neustadt, L.L.P.

(57) ABSTRACT

A system is provided that includes a cosmetic apparatus configured to sense at least a motion of a cosmetic implement during application of a cosmetic substance to the skin surface of a user; and a client device having processing circuitry configured to receive sensory information transmitted wirelessly from the cosmetic apparatus regarding the sensed motion of the cosmetic apparatus, and control display of information about the sensed motion of the cosmetic apparatus to the user.

16 Claims, 13 Drawing Sheets

(56) References Cited

U.S. PATENT DOCUMENTS

| | | | |
|---|---|---|---|
| 2014/0107047 A1* | 4/2014 | Lauten | A61K 47/12 |
| | | | 514/27 |
| 2015/0055085 A1* | 2/2015 | Fonte | G06F 16/22 |
| | | | 351/178 |
| 2015/0169062 A1* | 6/2015 | Park | G06F 3/016 |
| | | | 345/156 |
| 2017/0191866 A1* | 7/2017 | Balooch | G01J 1/429 |
| 2018/0075776 A1* | 3/2018 | Heitmann | A45D 1/16 |
| 2018/0184796 A1* | 7/2018 | Balooch | G09B 19/003 |
| 2018/0272035 A1* | 9/2018 | Retting | C12N 5/0698 |
| 2018/0279843 A1* | 10/2018 | Paul | A47K 7/04 |
| 2018/0288160 A1* | 10/2018 | Paul | H04L 67/125 |

* cited by examiner

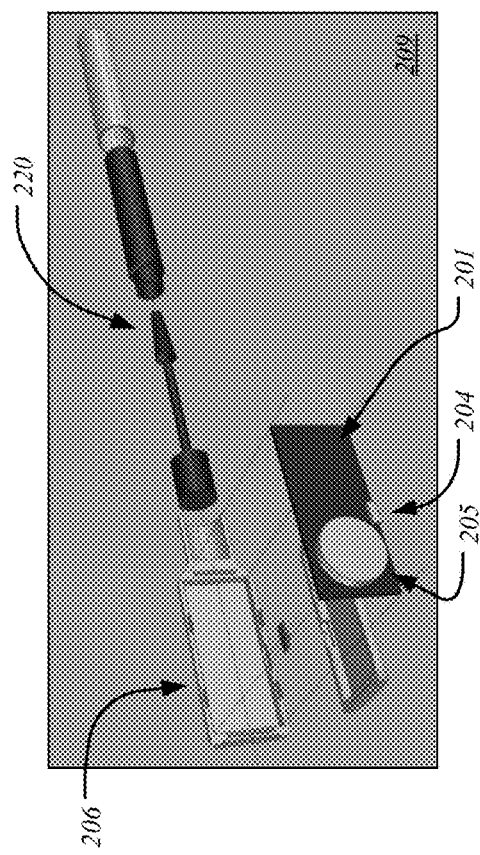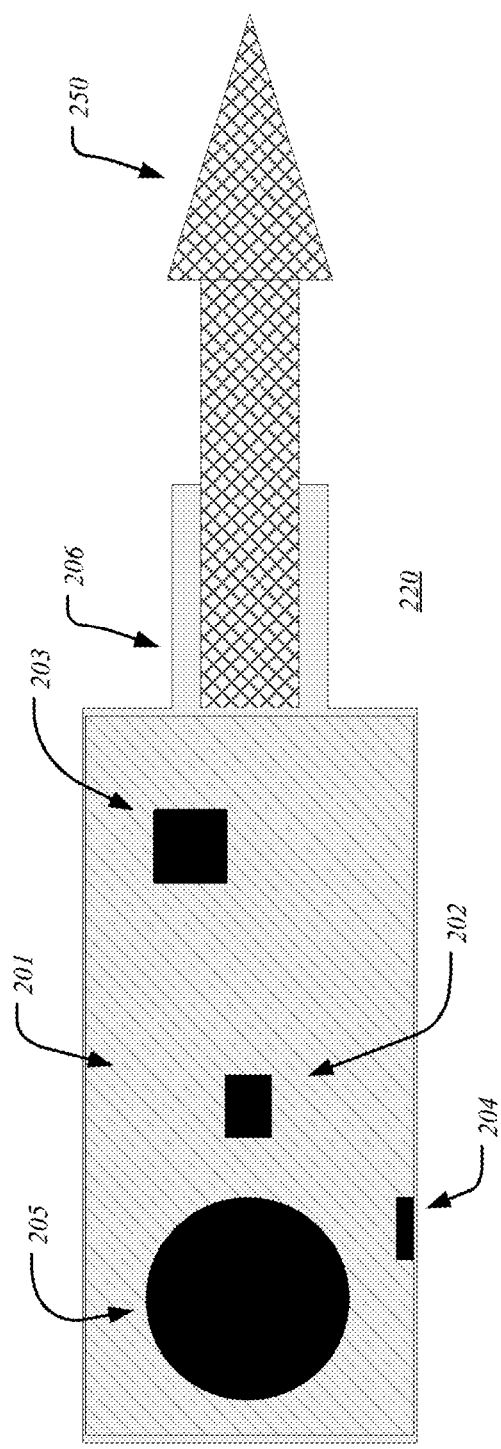

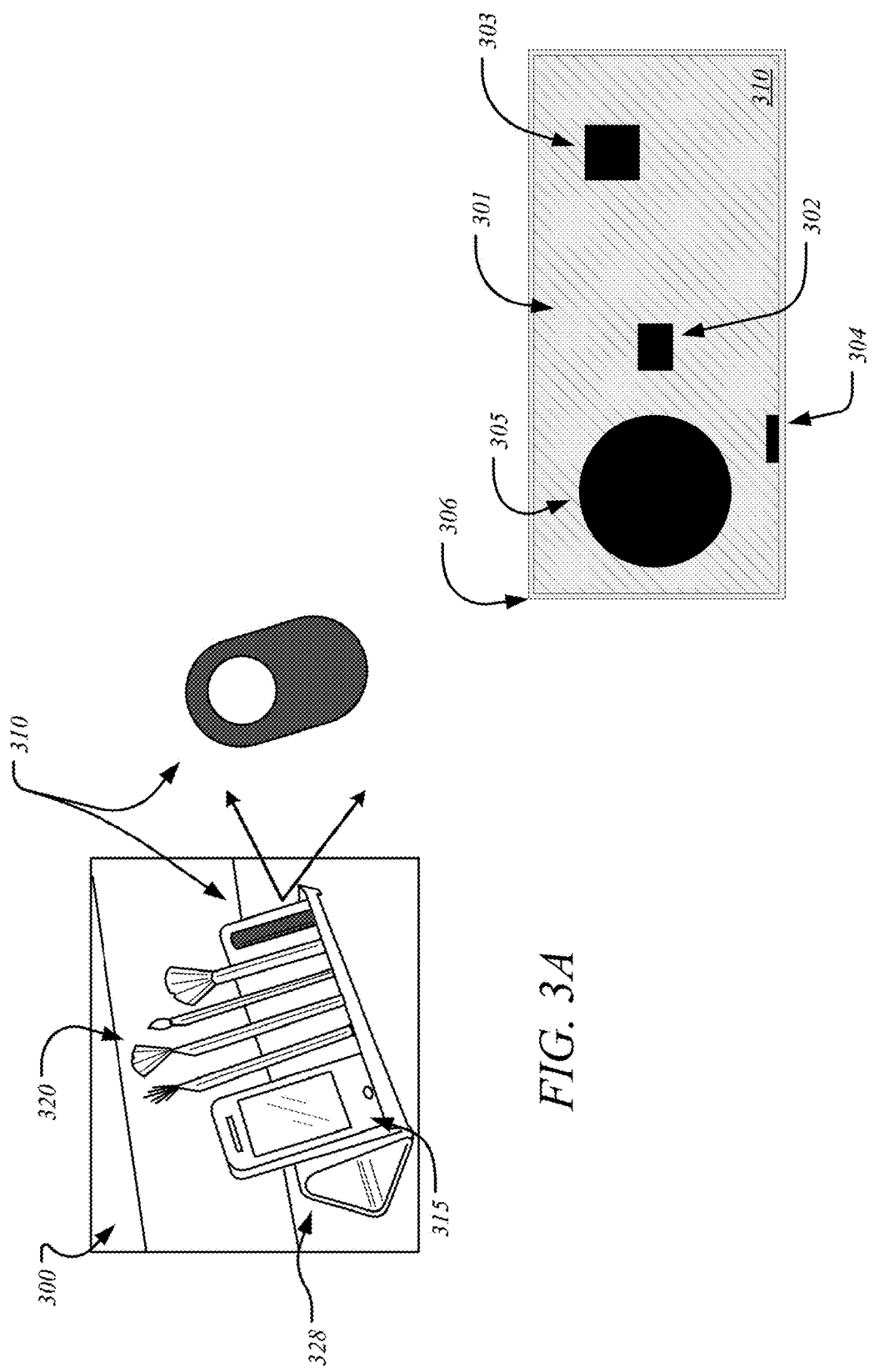

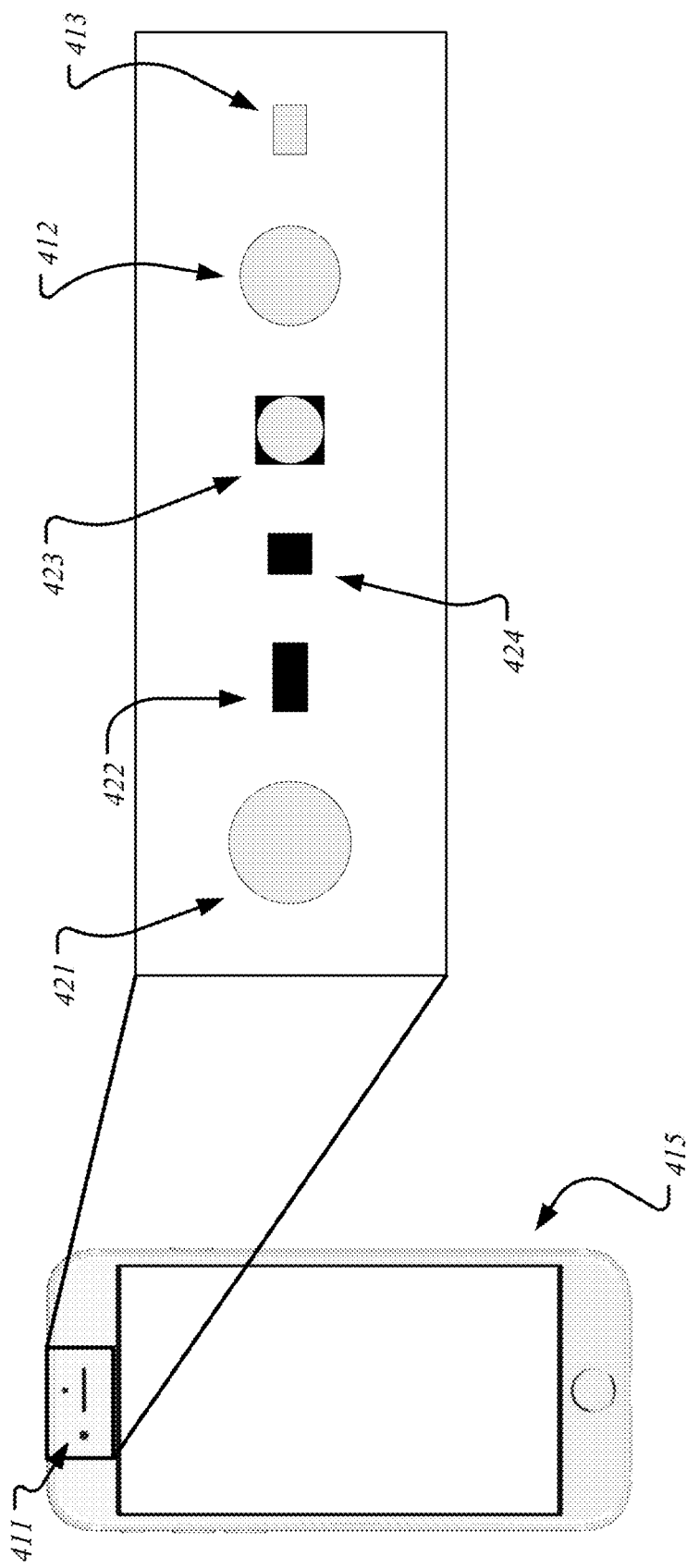

COSMETIC APPLICATOR SYSTEM INCLUDING TRACKABLE COSMETIC DEVICE, AND CLIENT DEVICE TO ASSIST USERS IN MAKEUP APPLICATION

BACKGROUND

Field of the Disclosure

The present disclosure relates to a system providing communication and feedback between an implement and a client device for makeup application.

Description of the Related Art

While consumers aspire to recreate cosmetic aesthetics on their own face, a lack of formal training often limits the complexity of the techniques that may be attempted. For many, particularly beauty enthusiasts, video tutorials are an accessible and instructive way to discover and leant looks. This experience is flawed, however, requiring the user to manually and iteratively pause, reverse, and resume play during the course of makeup application. The tedium therein is impractical in a high-paced world and, as a result, leaves consumers with few choices for confident experimentation with new looks. To this end, a user-friendly cosmetic application training system has yet to be developed.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a system, and method of the same, comprising an apparatus for makeup application and a client device having processing circuitry configured to receive sensor information and control display of the same.

According to an embodiment, the client device is further configured to receive input information from the user regarding a desired result and output guidance information on usage of the cosmetic implement to achieve the look. This guidance information can be based on a sensed characteristic from a single session or a plurality of sessions using the implement. In an embodiment, the input information from the user is based on user evaluation of an augment reality, wherein a potential desired look is visualized.

According to an embodiment, the client device is configured to actuate a discovery protocol that causes the client device and cosmetic apparatus to identify each other and negotiate one or more pre-shared keys, thereby enabling secure exchange of information.

According to an embodiment, the client device is configured to actuate a validation protocol that causes the client device and cosmetic apparatus to identify each other and negotiate one or more pre-shared keys, thereby enabling secure exchange of information.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2A is an exploded virtual model of an exemplary embodiment of the implement for makeup application;

FIG. 2B is a cross-sectional schematic of an exemplary embodiment of the implement for makeup application;

FIG. 3A is an exemplary illustration of the system of the present disclosure, with focus directed to the trackable sleeve;

FIG. 3B is a cross-sectional schematic of an exemplary embodiment of the trackable sleeve;

FIG. 4A is an exemplary embodiment of a client device;

FIG. 4B is a schematic of client device-based sensors, according to an exemplary embodiment;

DETAILED DESCRIPTION

The terms "a" or "an", as used herein, are defined as one or more than one. The term "plurality", as used herein, is defined as two or more than two. The term "another", as used herein, is defined as at least a second or more. The terms "brush" and "implement" may be used interchangeably. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The present disclosure addresses the need for a user-friendly, daily makeup application training system. By integrating makeup implements, or brushes, with motion tracking technology, and coupling these brushes to a client device-based software application, the present disclosure provides consumers a confident, convenient experience for learning and mastering new techniques on a daily basis. The system described herein aims to accomplish the following:

Provide a personalized user experience through capture of user facial features, color and tone using client device-based technologies.

Present a catalog of learnable techniques according to the available set of user cosmetic brushes.

Allow user experimentation via step-by-step training modules.

Limit manual interaction with the client device by linking module progression to the presence/absence of a connected, trackable sleeve collocated with cosmetic brushes.

Improve user mastery of techniques through feedback and training according to data received and processed from the trackable sleeve and client device-based sensors.

Encourage users to discover new looks via integration with user social media presence.

Figure 1:
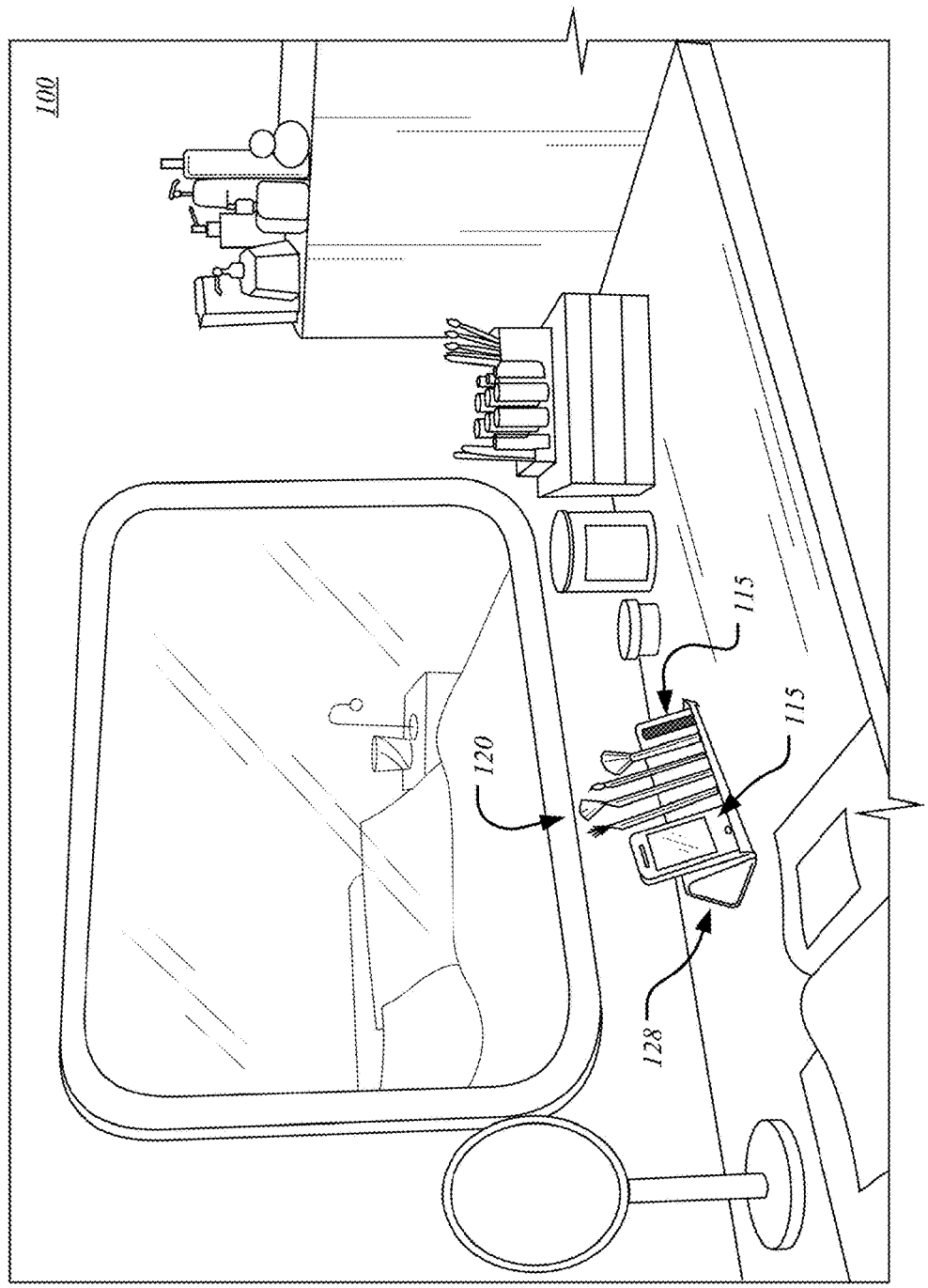
FIG. 1 is an exemplary illustration of the system of the present disclosure in a consumer environment, comprising a client device, an implement for makeup application, and a trackable sleeve.

FIG. 1 is an exemplary illustration of the system of the present disclosure in a consumer environment. The system 100 comprises a client device 115, a brush 120 for makeup application, and a trackable sleeve 110. While the brush 120 is a NYX brush in a preferred embodiment, the brush 120 can also be a user's preferred brush. This owes to the universality of the trackable sleeve 110. In a preferred embodiment, the system 100 includes a docking station 128, allowing for simultaneous wireless charging of the client device 115 and the trackable sleeve 110, and enabling hands-free progression of training during makeup application.

FIG. 2A is an exploded virtual model 209 of an exemplary embodiment of a brush 220 for makeup application, wherein the applicator 250 and motion tracking equipment are integrated into a single body. Circuit components associated with the sensing of motion and proximity are disposed on a printed circuit board 201 and are contained within a housing 206. A rechargeable battery 205 and communication unit 204 are disposed on the printed circuit board 201. In an embodiment, a housing 206 is fixed to each applicator 250, carrying, therein, a unique identifier and appropriate circuit components for tracking the applicator 250 in space. To this end, the printed circuit board 201 may be further outfitted with a proximity sensor, accelerometer, and gyroscope, as observable in FIG. 2B. The proximity sensor may employ capacitive, radar, sonar, or Doppler sensors, as is understood in the art.

In another embodiment of the present disclosure, motion tracking of the brush 220 is performed via motion capture of one or more fiduciary markings on the exterior of the brush. The position of the one or more fiduciary markings can be tracked in real-time, allowing for the determination of position, velocity, acceleration, and orientation of the brush as a function of time. Such motion tracking is understood in the art, as evidenced by U.S. Pat. No. 7,633,521 B2, which is incorporated herein by reference.

FIG. 2B is a cross-sectional schematic of an exemplary embodiment of the implement for makeup application. A rechargeable battery 205 powers the sensors and communication unit 204 of a substantially rectangular housing 206. A proximity sensor 202 measures the position of the implement 220 relative to objects of interest. To aid in motion tracking, an accelerometer/gyroscope 203 is disposed on the printed circuit board 201, indicating the angle, velocity, acceleration, and time associated with a given task. In an embodiment, the position/motion sensor is at least one of or a combination of a geomagnetic sensor and an acceleration sensor. For example, a 3-axis geomagnetic sensor ascertains the direction of geomagnetism, or in other words a geomagnetic vector Vt, given the current orientation of (the housing of) the implement 220 housing the 3-axis geomagnetic sensor. A 3-axis acceleration sensor ascertains the direction of gravity, or in other words a gravity vector G, given the current orientation of (the housing of) the implement 220 housing the 3-axis acceleration sensor in a still state. The gravity vector G matches the downward vertical direction. The gravity vector G likewise may be decomposed into Xs, Ys, and Zs axis components.

Alternatively, or additionally, a gyroscope may be used which is a sensor that detects angular velocity about the three axes Xs, Zs, and Ys (roll, pitch, and yaw), and is able to detect the rotation of an object. In addition, the geomagnetic sensor is able to ascertain the heading in which the object faces, based on a geomagnetic vector as discussed earlier.

Following measurement of the metrics described above, a communication unit 204 transmits the acquired data via wireless communication (e.g., radiofrequency, Bluetooth, WiFi, etc.) to a client device, wherein the acquired data can be processed and analyzed to instruct and improve user performance in real time.

In another embodiment, the implement 209 further comprises a force-sensitive resistor disposed on the printed circuit board 201 near the applicator 250, allowing for the generation of force data that may be transmitted to acid utilized by the client device to better inform user performance as it relates to the forces being exerted on the face by the user. Force data can also be more simply evaluated to determine contact with the user.

In another embodiment, the implement 209 further comprises a capacitive contact sensor at the end of the applicator 250, allowing for the determination of contact with the user's face.

In another embodiment, the implement 209 further comprises a haptic motor and haptic motor controller for feedback delivery to the user in the form of vibrations. For example, the implement 209 may vibrate when makeup is applied incorrectly or when makeup application is asymmetric, as detected by implement 209 based sensors, client device-based sensors, or a combination thereof.

Sensor data collection, transmittance, acquisition, and analysis occur continuously to provide unmitigated guidance to the user in real time.

FIG. 3A is an exemplary illustration of the system of the present disclosure, with focus directed to the trackable sleeve. The trackable sleeve 310 is a component of a system 300 including cosmetic implements 320 and a client device 315. In an embodiment, the cosmetic implement is a brush 320. The system 300 may further support a docking station 328 for wireless charging of the client device 315 and the trackable sleeve 310, thus enabling, hands-free progression of training during makeup application as the user does not need to hold or tactilely interact with the client device 315. The trackable sleeve 310 is of a substantially cylindrical shape and is designed to accommodate the diameter of a variety of commercially available cosmetic brushes for makeup application.

FIG. 3B is a cross-sectional schematic of an exemplary embodiment of the trackable sleeve. Inside the trackable sleeve 310, circuit components resemble those identified in FIG. 2B for an embodiment of a cosmetic implement. A rechargeable battery 305, proximity sensor 302, and an accelerometer/gyroscope 303 are disposed on a printed circuit board 301 within a housing 306, together forming the trackable sleeve 310. According to an embodiment, the proximity sensor 302 is an infrared-based sensor positioned in order to measure distance between the user's face and the applicator of the implement. The proximity sensor 302 can also include, but is not limited to, capacitive, radar, sonar, ultrasonic, or Doppler sensors. A communication unit 304, including, but not limited to, Bluetooth, radiofrequency, Wi-Fi, or a combination thereof, is further disposed on the printed circuit board 301 and interfaces with a client device. The communication unit 304 transmits data acquired by the abovementioned sensors to the client device for processing and analysis. These data include position, velocity, acceleration, and orientation. The rechargeable battery 305 may be revitalized via methodologies known in the art, including conductive and inductive energy transfer modalities.

In an embodiment, the communication unit 304 further comprises a near-field communication (NFC) reader for communication of a unique NFC identifier tag associated with an implement. During initialization of the client device-based software, a unique NFC identifier tag is assigned to each implement in a collection. Prior to makeup application according to client device-based software instructions in a training, module, the unique NFC identifier tag is confirmed by the client device-based software, via transmission from the NFC reader of the trackable sleeve 310, to ensure the correct implement is in use.

In another embodiment, the trackable sleeve 310 accesses proximity data and acceleration data to generate force data that may be transmitted to and utilized by the client device to better inform user performance as it relates to the forces being exerted on the face by the user. Force data can also be more simply evaluated to determine contact with the user.

In another embodiment, the trackable sleeve 310 further comprises a haptic motor and haptic motor controller for vibratory feedback delivery to the user. For example, the trackable sleeve 310 may vibrate when makeup is applied incorrectly or when makeup application is asymmetric, as detected by trackable sleeve-based sensors, client device-based sensors, or a combination thereof.

FIG. 4A is an exemplary embodiment of a client device. According to an embodiment, the client device 415 is a smartphone, including front-facing sensors 411, of the kind typified by an Apple iPhone. FIG. 4B is a schematic of these client device-based sensors, according to an exemplary embodiment. The front-facing sensors 411 of the client device 415 may include, but are not limited to, an infrared camera 421, an infrared flood illuminator 422, a proximity sensor 424, a dot projector 423, a visible light camera 412, and a visible light flood illuminator 413. The combination of the above mentioned front-facing sensors 411 allows for capture and recreation of realistic three-dimensional models of a user's facial features, skin color, and tone. Such depth-dependent digitization of the face is understood in the art, as evidenced by U.S. Pat. No. 9,582,889 B2, which is incorporated herein by reference.

Figure 5A:
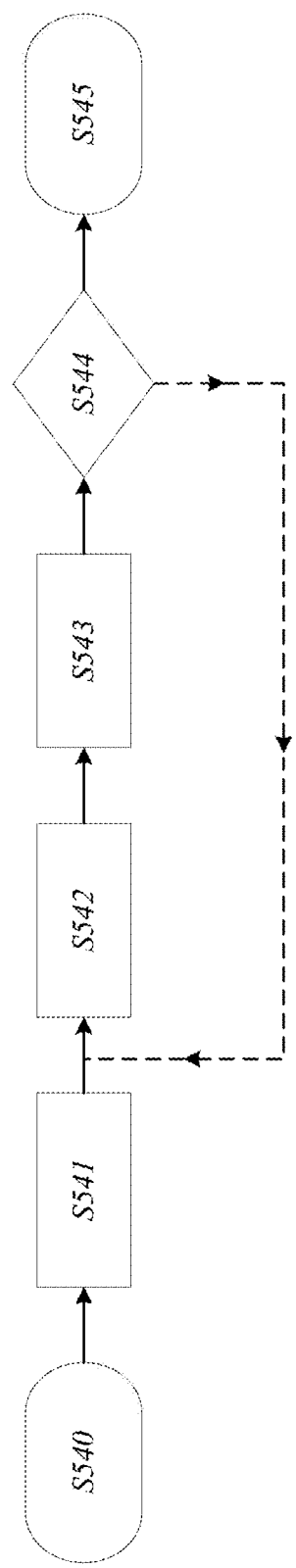
FIG. 5A is a flowchart of sensing and evaluation sensor inputs during a training module, according to an exemplary embodiment.

FIG. 5A is a flowchart of sensing and evaluation of sensor inputs during a training module, according to an exemplary embodiment. Following an initial instruction from client device-based software to prepare a brush for a specific cosmetic technique, progression to the next step of the training module requires the trackable sleeve to be coupled, circumferentially, to the brush. When the trackable sleeve has been coupled to the brush, the proximity sensor of the trackable sleeve recognizes the proximity of the brush, client device-based software, in communication with the NFC reader of the trackable sleeve, confirms the intender identity of the brush based upon an NFC identifier tag on the brush, and both generate a signal that the communication unit transmits to the client device S540. After reception of the signal generated by the proximity sensor and NFC device, the client device initiates the next training in the makeup application module, having interpreted the transmitted signal as an indication the user is ready to progress to the next step in the makeup application module S541. Initialization of a next step in the makeup application module may also be completed by a user input such as a vocal command, tactile command, or facial gesture as recorded by client device-based sensors. As the user performs technique training as presented by the client device, sensors based on the trackable sleeve and the client device record, transmit, receive, process, analyze and store data S542 related to the movement of the user, the movement of the brush, and the performance of the user in regards to the training provided. In an embodiment, the trackable sleeve further comprises on-board memory. Sensor data generated by the trackable sleeve and transmitted to the client device, as well as sensor data generated by the client device, may be stored to the trackable sleeve on-board memory, memory based in a client device, cloud-based memory, or a combination thereof. At each step in the training process, analyzed data from client device-based sensors, as well as trackable sleeve based-sensors, may be used to provide feedback and improve user mastery of techniques S543. This feedback may be audible, visual, or haptic, for example as a pulse or vibration delivered to the brush intended to alert the user to a desired modification in technique. The modification in technique may be to hold the brush at a certain angle or increase the speed at which the cosmetic is applied.

In an embodiment, image data of the user's face at the end of makeup application is considered concurrently with trackable sleeve-based sensor data to provide future guidance when performing the technique. For example, if analysis of the end result of the makeup application determines that the user applied the makeup with the implement at an incorrect angle, resulting in a wider line than intended, the client device-based software is able to provide constructive feedback on how to better hold the implement to improve future instances of the technique. In another embodiment, image data of the user's face at the end of makeup application is considered concurrently with trackable sleeve-based sensor data to evaluate the user's performance as it relates to a point-based scoring system. For example, if only a few minor mistakes are made by the user during makeup application, the client device-based software may give the user a score of 7 out of 10 and recommend techniques to improve in the future, such as applying less force during a certain motion to gradually decrease the width of a line. By recording user scores, the training session allows the user to track their progress and provides motivation to the user to improve in future instances of the technique so as to achieve 'Mastery'. Moreover, these scores may be shared via social media networks in order to compete with friends and motivate each other, simultaneously.

In another embodiment, user satisfaction during makeup application in a training session, as indicated by the user following completion of a technique, is recorded and further instruction, based on the user's experience, may be provided. For example, if a user applies eyeliner according to a training module, but is finds the eyeliner is not as bold as preferred, the user may probe the client device-based software for additional help and receive feedback such as, "Try applying more pressure for less time during application.".

Following user completion of the active software training module, the software determines if additional training modules are available for the current technique S544 or if further techniques are desired and, if so, returns to S542 to enter a new technique training module and awaits an initialization action from the user. If the technique is completed and no further modules or techniques are desired, the trackable sleeve is removed and the training ends S545.

Figure 5B:
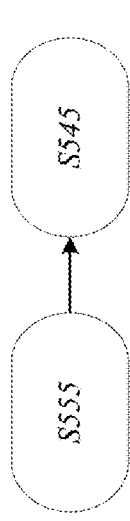
FIG. 5B through FIG. 5H are sub flowcharts of sensing and evaluation, according to an exemplary embodiment.

FIG. 5B is a sub flowchart of the sensor activation process, according to an exemplary embodiment. First, the trackable sleeve receives a signal from the client device, via the communication unit, indicating the user is beginning a training session S555. This signal then activates sensing of the trackable sleeve-based sensors S556.

Figure 5C:
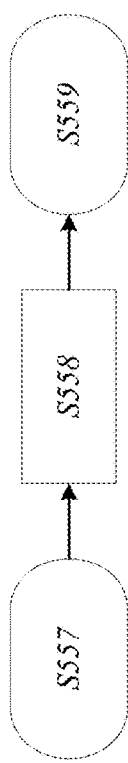

FIG. 5C is a sub flowchart of the coupling process between the trackable sleeve and the brush, according to an exemplary embodiment. The proximity sensor measures the relative location of the trackable sleeve and the brush and transmits a signal to the processing circuitry of the trackable sleeve S557 when the two are coupled. Following receipt of the signal from the proximity sensor, the processing circuitry probes the NFC device in the communication unit for information related to the NFC identifier tag of the brush S558. Then, the processing circuitry of the trackable sleeve sends the NFC identifier tag to the communication unit for transmission to the client device for validation S559.

Figure 5D:
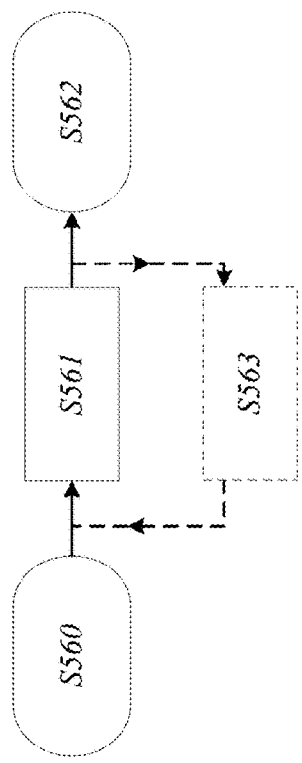

FIG. 5D is a sub flowchart of sensing and transmitting within the trackable sleeve, according to an exemplary embodiment. First, the trackable sleeve-based sensors are activated in response to initialization of a training session S560. Sensed data from the trackable-sleeve based sensors is received at the processing circuitry at periodic intervals S561. Following receipt of sensed data, the processing circuitry transmits the data to the communication unit for wireless transmission to the client device S562. During sensing and transmission of the sensed data, a portion of the sensed data is stored to local storage S563.

Figure 5E:
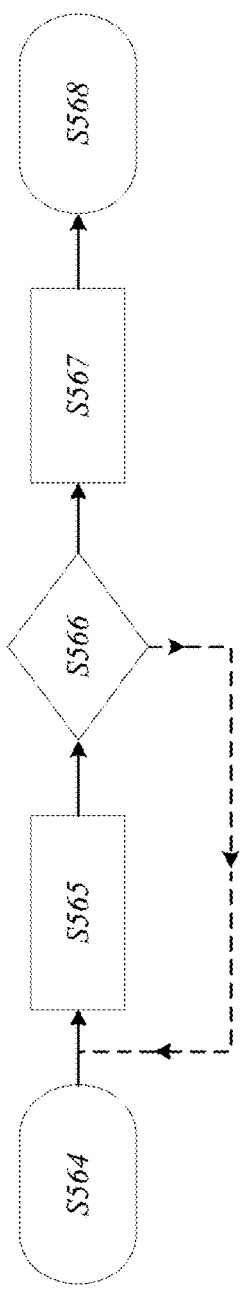

FIG. 5E is a sub flowchart of transmission of sensed data and feedback between the trackable sleeve and the client device, according to an exemplary embodiment. First, a sensed data is transmitted from the trackable sleeve to the client device S564. Then, the client device receives the transmitted sensed data and evaluates the sensed data according to standards S565. If it is determined that a discrepancy exists between the current user's actions and the average user's actions S566 the trackable sleeve will receive a transmitted feedback signal from the client device S567. Otherwise, passive evaluation of the transmitted sensed data will continue. Upon receipt of the transmitted feedback signal, the trackable sleeve will activate a circuit component, such as a haptic sensor, wherein a vibratory alert is felt by the user to indicate poor performance S568.

Figure 5F:
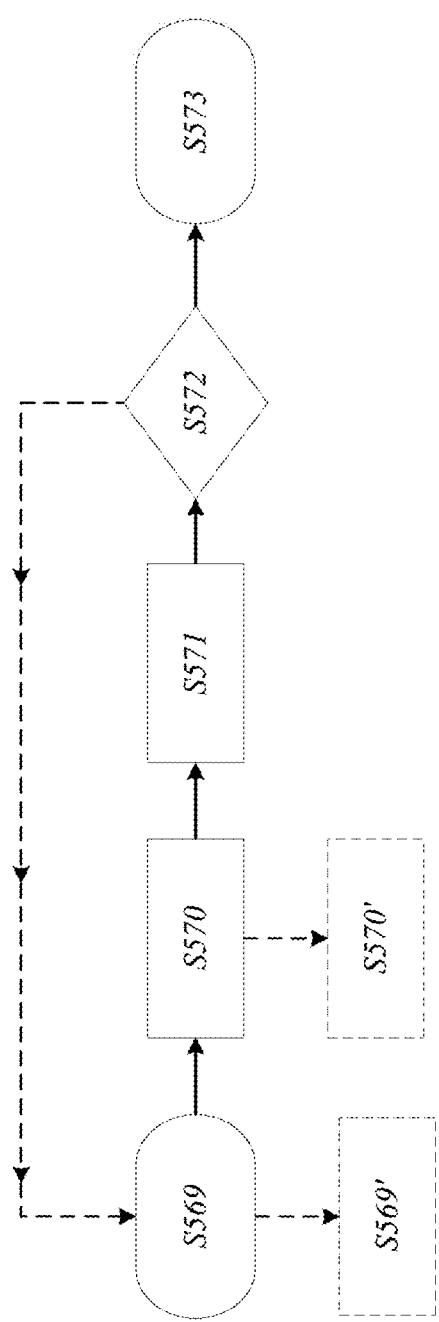

FIG. 5F is a sub flowchart of receipt of sensed data and output by the client device, according to an exemplary embodiment. First, the client device receives sensed data from the trackable sleeve S569 and stores it to local-based and cloud-based storage S569'. Next, the sensed data is processed by the client device-based software S570, and the processed data is stored to local-based and cloud-based storage S570'. The processed data is then, analyzed by the client device-based software S571 and it is determined if an adjustment to the client device output is needed S572. If an adjustment is needed, the client device-based software modifies the client device output, accordingly S573. Otherwise, passive evaluation of the transmitted sensed data will continue.

Figure 5G:
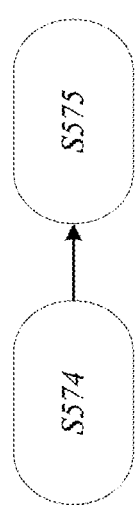

FIG. 5G is a sub flowchart of the output by the client device, according to an exemplary embodiment. Following sensing, transmission, and evaluation of the sensed data, the client device-based software may determine it appropriate to modify the output of the client device S574, wherein the output of the client device includes video, audio, and haptic data. For example, as a user performs a training session and the client device receives sensed data, it may be appropriate to provide visual feedback to the user regarding the user's performance, the client device acting as a mirror to present the raw user performance S575. Therefore, the client device, based upon the received sensed data, presents video data to the user of the user's performance for self-assessment.

Figure 5H:
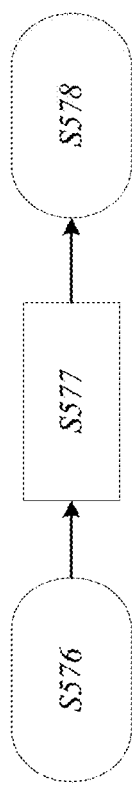

FIG. 5H is a sub flowchart of the output by the client device, according to an exemplary embodiment. Following sensing, transmission, and evaluation of the sensed data, the client device-based, software may determine it appropriate to modify the output of the client device S576, wherein the output of the client device includes video, audio, and haptic data. For example, as a user performs a training session and the client device receives sensed data, it may be appropriate to provide feedback to the user regarding the user's performance. In an embodiment, the client device provides coaching suggestions based upon an evaluation of the sensed data relative to prior instances of the sensed data or global averages of the sensed data for specific techniques S577. In turn, the client device may provide pointed feedback to the user via video and audio output, provided client device-based feedback to the user S578.

Figure 6:
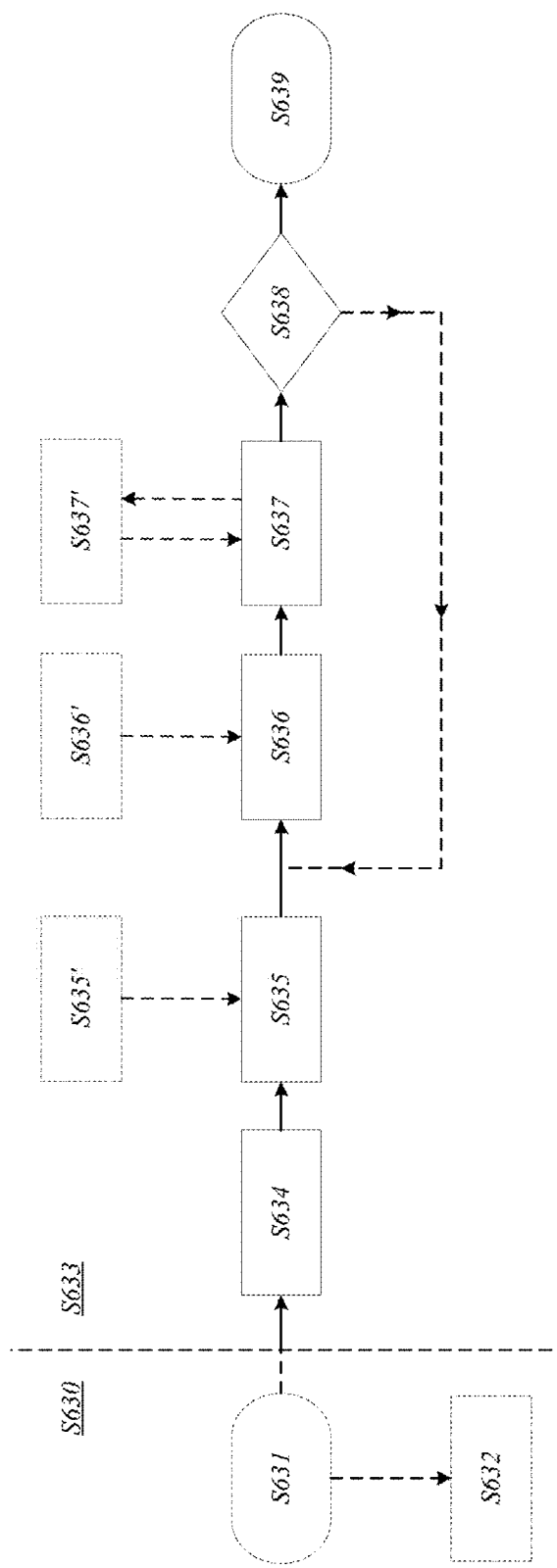
FIG. 6 is a flowchart of a user experience during a training session, according to an exemplary embodiment.

FIG. 6 is a flowchart of a user experience during a training, session, according to an exemplary embodiment. During user onboarding S630, client device-based sensors are used to perform a three-dimensional digitization S631 of the facial features, color, and tone of the user. Client device software then adjusts to calibrate the image and color projection according to ambient lighting.

Next, the user selects the brushes available at home S632, identifying and registering this information within the client device-based software, thereby defining the scope of possible training techniques according to the available brushes. A unique identifier is added to each brush in the collection. In an embodiment, identification and registration utilizes near field communication (NFC) or similar wireless communication modality. First, a user navigates the user interface of the client device-based software to locate the types of brushes the user owns. For each brush type located, a unique NFC identifier tag, including, but not limited to a "smart" sticker, is positioned on the brush so that it is in proximity to the trackable sleeve when the trackable sleeve is coupled to the brush. To register the NFC identifier tag within the client device-based software, the trackable sleeve is coupled to the brush and an NFC reader within the trackable sleeve ascertains the NFC identifier tag of the brush. This NFC identifier tag is communicated via the communication unit to the client device-based software, thus syncing the unique NFC identifier tag with a brush type and registering the relationship During operation, the NFC identifier tag is used to confirm that a user has selected the appropriate brush for the current training module.

In another embodiment, each identifier tag is pre-allocated to a set of "smart" stickers with indicia corresponding to specific types of brushes. During brush identification and registration, the user navigates the user interface of the client device-based software to locate the types of brushes the user owns. The user is then instructed to place a specific "smart" sticker onto a corresponding brush, thus registering a relationship between an identifier tag and a brush.

If the user has available the same brushes at each training session, user profile creation, including brush collection registration, is a one-time event. Once a user profile has been created and brushes have been identified and registered, everyday training may begin S633. First, a user selects a desired makeup technique to learn. For example, this may be cat eye, contouring, strobing, bold brow, or others S634. The client device software can also recommend techniques according to the available brushes and based upon prior user selection. To this end, client device software may also incorporate social media content associated with the user's user profile to better inform and predict techniques of interest to the user based upon preferences indicated within the user's social media presence. Next, the client device software asks the user's current skill level with respect to a specific technique S635. This user skill baseline provides a starting point and helps the client device-based software to generate a training module useful and encouraging for the user without negatively impacting user confidence, as indicated by the user response to this step. If it is not the first time the user has selected a specific technique, the client device software will integrate user response with prior user performance S635' to appropriately modify the training, module for continued improvement of user mastery of the technique. To begin a training module, as instructed, the user couples the trackable sleeve to the identified brush. The trackable sleeve communicates the NFC identifier tag to the client device-based software in order to validate the brush selected in context of the intended brush. With the trackable sleeve coupled to the correct, identified brush S636, training begins with a first instructional unit. Each training module may comprise multiple instructional units requiring an array of available brushes, according to the technique in training.

During the training module, client device-based sensors and trackable sleeve-based sensors are actively monitoring the performance of the user and comparing output metrics to established standards for corresponding techniques S636'. If it is determined that the user is applying the cosmetic at an improper angle or with improper speed, the client device, the trackable sleeve, or a combination thereof may provide instruction and encouragement via audible, visual, or haptic alerts.

In an embodiment, the client device-based software processes transmitted data from the trackable sleeve regarding motion of the brush, and provides technique-based feedback. For example, the client device-based software array provide audio, video or text feedback such as "For a more blended finish, try applying your foundation using downward strokes" or "Your eyeliner application is a bit shaky. Try resting your pinky on your cheek to get more stability."

In an embodiment, the client device-based software processes transmitted data from the trackable sleeve regarding position of the brush, and provides feedback regarding makeup application location and accuracy. For example, the client device-based software may provide audio, video, or text feedback such as "Next time, try extending the cat eye wing further for a more dramatic look". Further, the client device-based software may provide haptic alerts to the user when the brush is in an incorrect location, such as when the user is "coloring outside the lines".

In an embodiment, wherein the technique is applied to both sides of the face across a midline, the client device-based software processes transmitted data from the trackable sleeve regarding movement and position of the brush, and provides feedback regarding the symmetry of makeup application. For example, the client device-based software may provide audio, video, or text feedback such as "Make your eyeliner on your right eye a bit thicker to match your left". Further, the client device-based software may provide haptic alerts to the user when the user fails to mimic makeup application of features across the midline, thus ensuring symmetry.

As the user completes the first instructional unit, post-application analysis of user performance is performed S637'. In an embodiment, image data of the user's face at the end of makeup application is evaluated concurrently with trackable sleeve-based sensor data. If analysis of the end result of the makeup application determines that the user applied the makeup too quickly, resulting in a streakier finish than intended, the client device-based software is able to provide constructive feedback on how to better the technique in the future. In another embodiment, the same data is used to evaluate the user's performance as it relates to a point-based scoring system. For example, if numerous mistakes were made by the user during makeup application, the client device-based software may give the user a score of 4 out of 10, but provide recommended techniques and encouragement in order to improve in the future. These recommendations may include performing a stroke in a preferred direction, for example from right to left. By recording user scores, the training session allows the user to track their progress and provides motivation to the user to improve in future instances of the technique so as to achieve 'Mastery'. Moreover, these scores may be shared via social media networks in order to compete with friends and motivate each other, simultaneously.

In another embodiment, user satisfaction during makeup application in a training session, as indicated by the user following completion of a technique, is recorded and further instruction, based on the user's experience, may be provided. For example, if a user applies eyeliner according to a training module, but is finds the eyeliner is not as bold as preferred, the user may probe the client device-based software for additional help and receive feedback such as, "Try applying more pressure for less time during application.".

The user then removes the trackable sleeve from the implement S637 to prompt a second instructional unit, if one exists S638. If so, the client device software returns to instructional unit initialization S636, and requests the user to couple the trackable sleeve to the appropriate, identified brush for the second instructional unit. If no further instructional units are available for the selected technique, training ends S639 and the user is encouraged to try new techniques and advance to more complex skills.

Each instructional unit is comprised of an instructional video that provides step-by-step instructions on the proper application of makeup for a certain technique. Progression to the next step is controlled by the user and, therefore, improves efficiency in the learning process.

According to an embodiment, user-based and client device-based software feedback are provided at the end of the training module. The actual result of the training module is compared with the desired result, allowing for both self-assessment and client device-based software assessment of the user's performance.

In another embodiment, the client device is configured to employ augmented reality technologies. In this way, during the technique selection process S634, the user is able to visualize and see, on their face, the possible end result of a specific makeup technique.

Figure 7A:
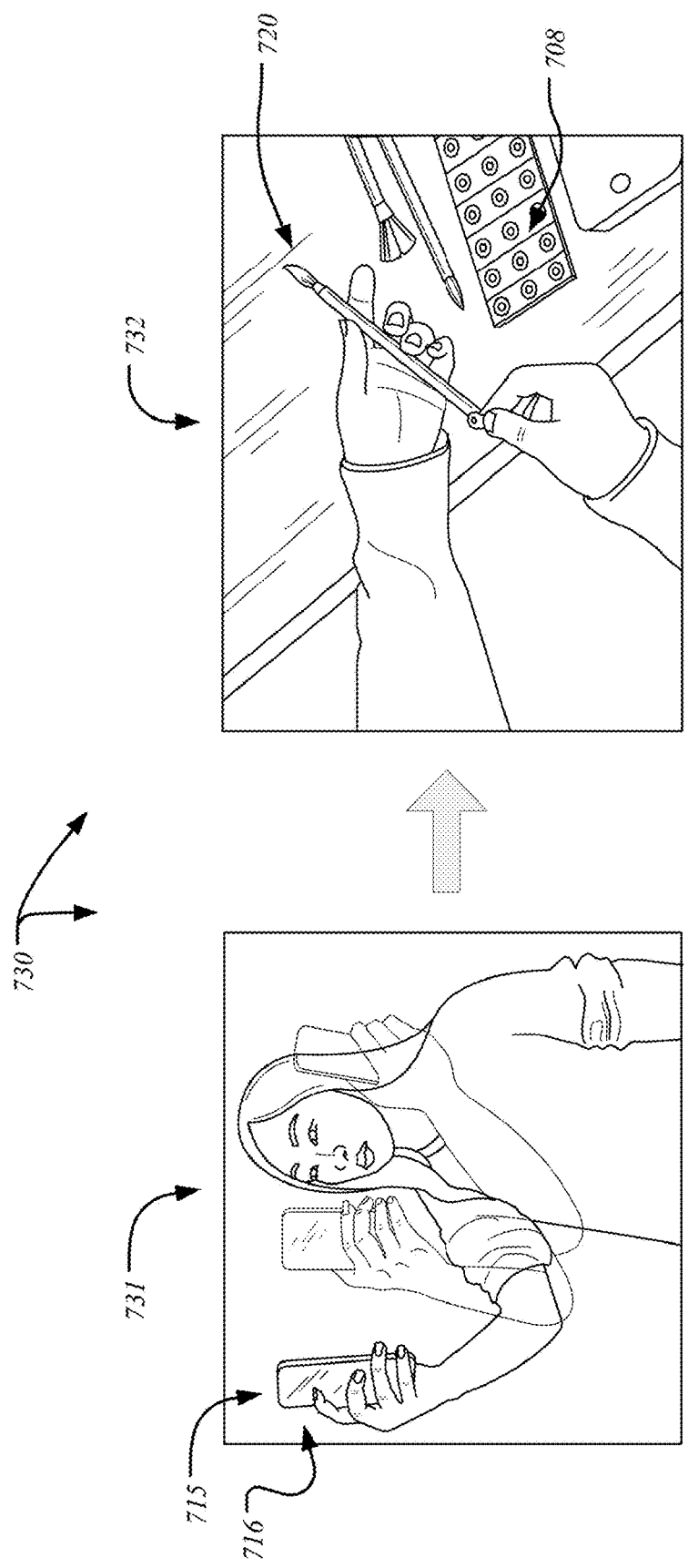
FIG. 7A is an illustration of the flowchart of user experience during an onboarding portion of a training module, according to an exemplary embodiment.

FIG. 7A is an illustration of a flowchart of user experience during an onboarding portion of a training session, according to an exemplary embodiment. During user onboarding 730, client device-based sensors are used to perform a three-dimensional digitization 731 of the facial features, color, and tone of the user. To do this, the user is instructed to hold and move the client device 715, or smartphone 716, at positions relative to their face to fully capture three-dimensional facial features and, in particular, depth mapping. Client device software then adjusts to calibrate the image and color projection according to ambient lighting. Next, the user selects the brushes 720 available in their collection at home, identifying and registering this information within the client device-based software. A unique identifier is added to each brush to facilitate correct brush implementation during the training modules. This identification and registration of available brushes 732 defines the scope of possible learned techniques. In an embodiment, the unique identifier is an NFC identifier tag registered to a corresponding brush. An NFC identifier tag reader, housed within the trackable sleeve, transmits this NFC identifier tag to the client device-based software prior each step of the instructional unit to confirm correct user selection of the desired brush. If the same collection of brushes is available to the user at each training session, user profile creation, wherein the collection of brushes is identified and registered, is a one-time event.

Figure 7B:
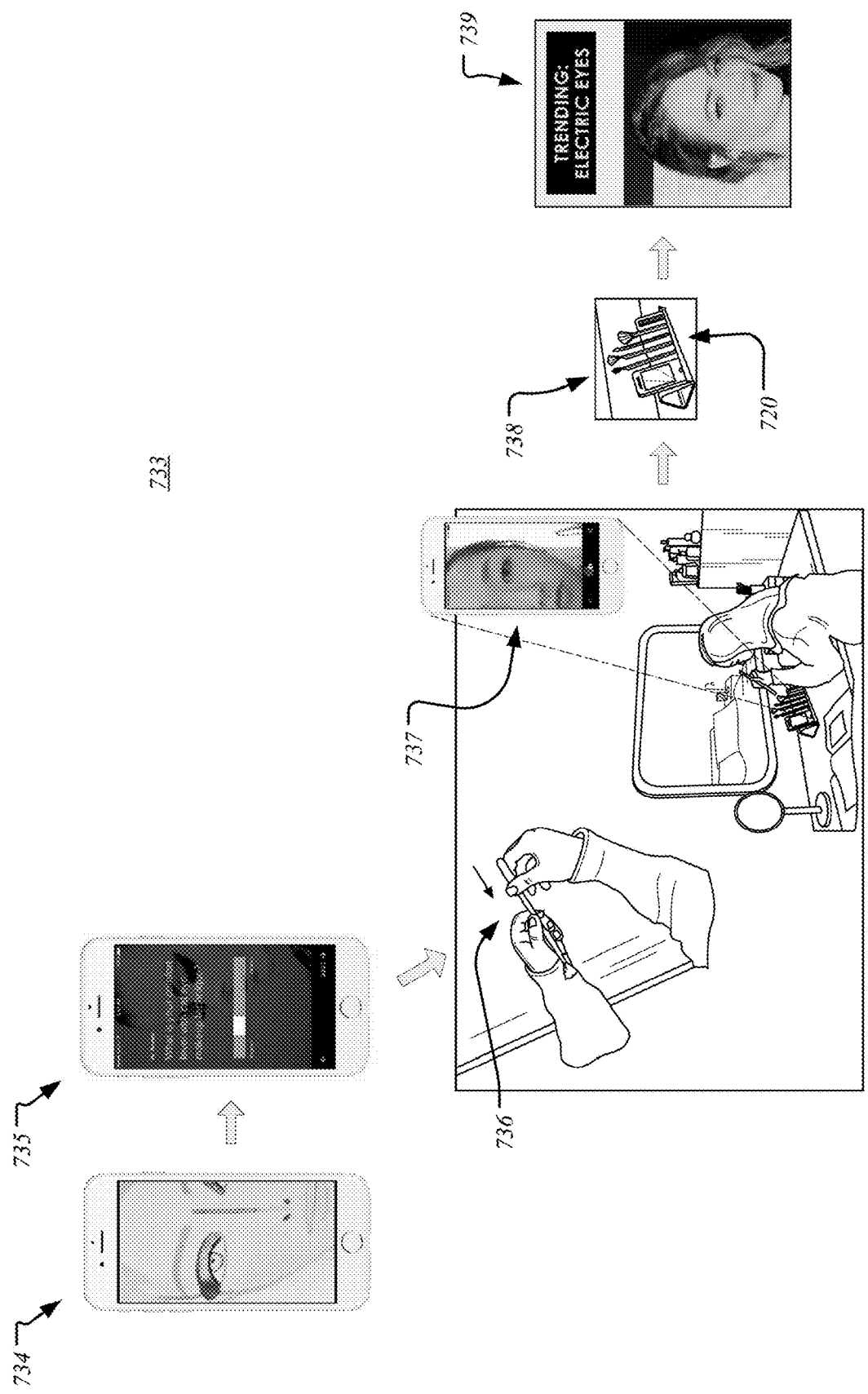
FIG. 7B is an illustration of the flowchart of user experience during a training module of a training module, according to an exemplary embodiment.

Once a user profile has been created and brushes have been identified and registered, everyday training may begin 733. FIG. 7B is an illustration of the flowchart of user experience during an instructional unit of a training module, according to an exemplary embodiment. First, a user selects a desired makeup technique to learn 734. For example, this may be cat eye, contouring, strobing, bold brow, or others. The client device software can also recommend techniques according to the available brushes and based upon prior user selection. To this end, client device software may also incorporate social media content associated with the user's user profile to better inform and predict techniques of interest to the user based upon preferences indicated within the user's social media presence. Next, the client device software asks the user's current skill level with respect to a specific technique 735. This user skill baseline provides a starting point and helps the client device software to generate a training module useful and encouraging for the user. If it is not the first time the user has selected a specific technique, the client device software will integrate user response with prior user performance to appropriately modify the training module to continue improvement of user mastery of the technique without negatively impacting user confidence, as indicated by the user response to this step. To begin the training module, as instructed, the user couples the trackable sleeve to the identified brush 736, wherein the trackable sleeve communicates the unique identifier of the brush to the client device-based software, confirming the correct identity of the brush. With the trackable sleeve coupled to the correct, identified brush, training begins with a first instructional unit 737.

During the training module, client device-based sensors and trackable sleeve-based sensors actively monitor the performance of the user and compare output metrics to established standards for corresponding techniques. If it is determined that the user is applying the cosmetic at an improper angle or with improper speed. the client device, the trackable sleeve, or a combination thereof may provide instruction and encouragement via audible, visual, or haptic alerts. The user will, in turn, respond to the alert and continue training with the confidence of knowing the technique is being performed appropriately. As the user completes the first instructional unit, post-application analysis of user performance is performed before moving to the next instructional unit. Post-application analysis includes the abovementioned simultaneous evaluation of client device-based sensors and trackable sleeve-based sensors for whole look feedback, makeup application scoring system, social media-based competitive scoring, and user satisfaction support.

With the first instructional unit and post-application analysis completed, the user removes the trackable sleeve from the brush to prompt a second instructional unit, if one exists. If so 738, the client device software returns to instructional unit initialization, and requests that the user again couple the trackable sleeve to the next identified brush 720. If no further instructional units are available for the selected technique, the training module ends 739. If the user is satisfied with the technique or would like to save the technique for continued training and improvement at a later time, the client device software allows the user to end the training and favorite the technique. In any case, based on user proficiency with the current technique, available brushes in the collection, and anticipated user interest, the user is encouraged to train with new techniques and advance to more complex skills.

Figure 8A:
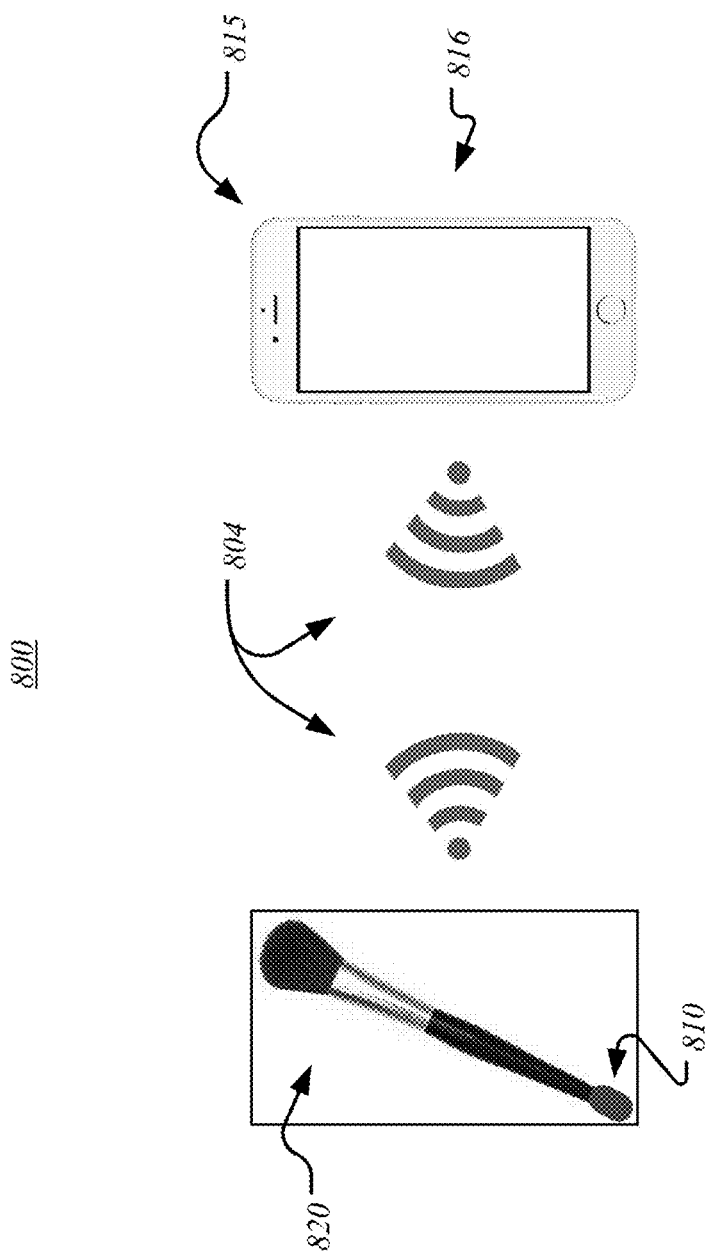
FIG. 8A illustrates the wireless communications between an implement and a client device, according to an exemplary embodiment.

FIG. 8A is a schematic illustrating the wireless communications between a cosmetic implement and a client device, according to an exemplary embodiment. A system 800 includes an implement 820, a trackable sleeve 810, and a client device 815. In an embodiment, the implement 820 is a brush 820 and the client device 815 is a smartphone 816. The brush 820 and trackable sleeve 810 are in communication with the smartphone 816 via wireless communication 804. In an embodiment, the smartphone 816 is configured to operate a software application or set of software modules to receive and send communications to and from the brush 820. In an example, the software application can send a protocol or target profile to the brush 820, as well as receive data from the brush 820 to track usage in real time. Similarly, the brush 820, in concert with the trackable sleeve 810, is configured to send and receive communications to and from the smartphone 816. The wireless communication 804 can occur via an appropriate signal such as electromagnetic (e.g., WiFi, Bluetooth, near-field), optical, acoustic, or a combination thereof.

Figure 8B:
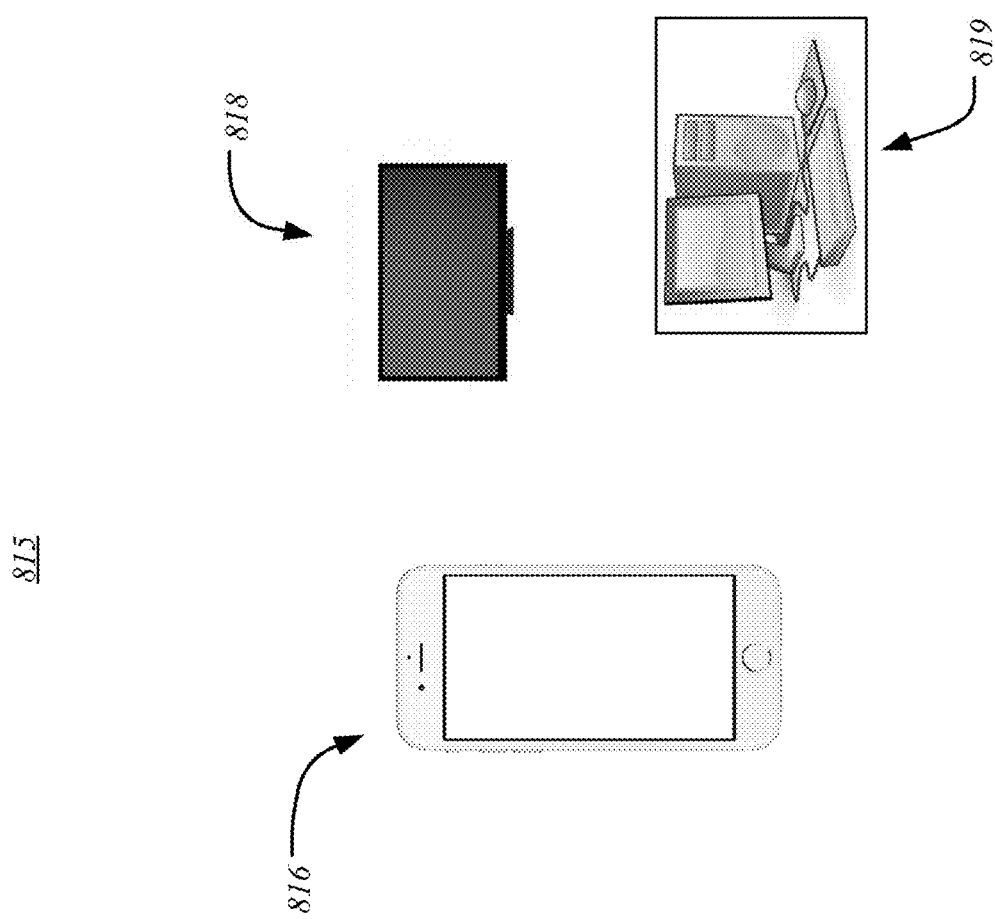
FIG. 8B illustrates examples of client devices for use with the system of the present disclosure.

FIG. 8B is a schematic illustrating examples of client devices 815 for use with the system of the present disclosure, including a smartphone 816, a television or magic mirror 818, and a personal computer or laptop 819. Each client device, and including the cosmetic brush, may communicate with each other through an internet connection via 802.11 wireless connection to a wireless internet access point, or a physical connection to the internet access point (e.g., Ethernet interface). Each connected device is capable of performing wireless communication with other devices, as well, such as through a Bluetooth connection or other wireless means.

Figure 8C:
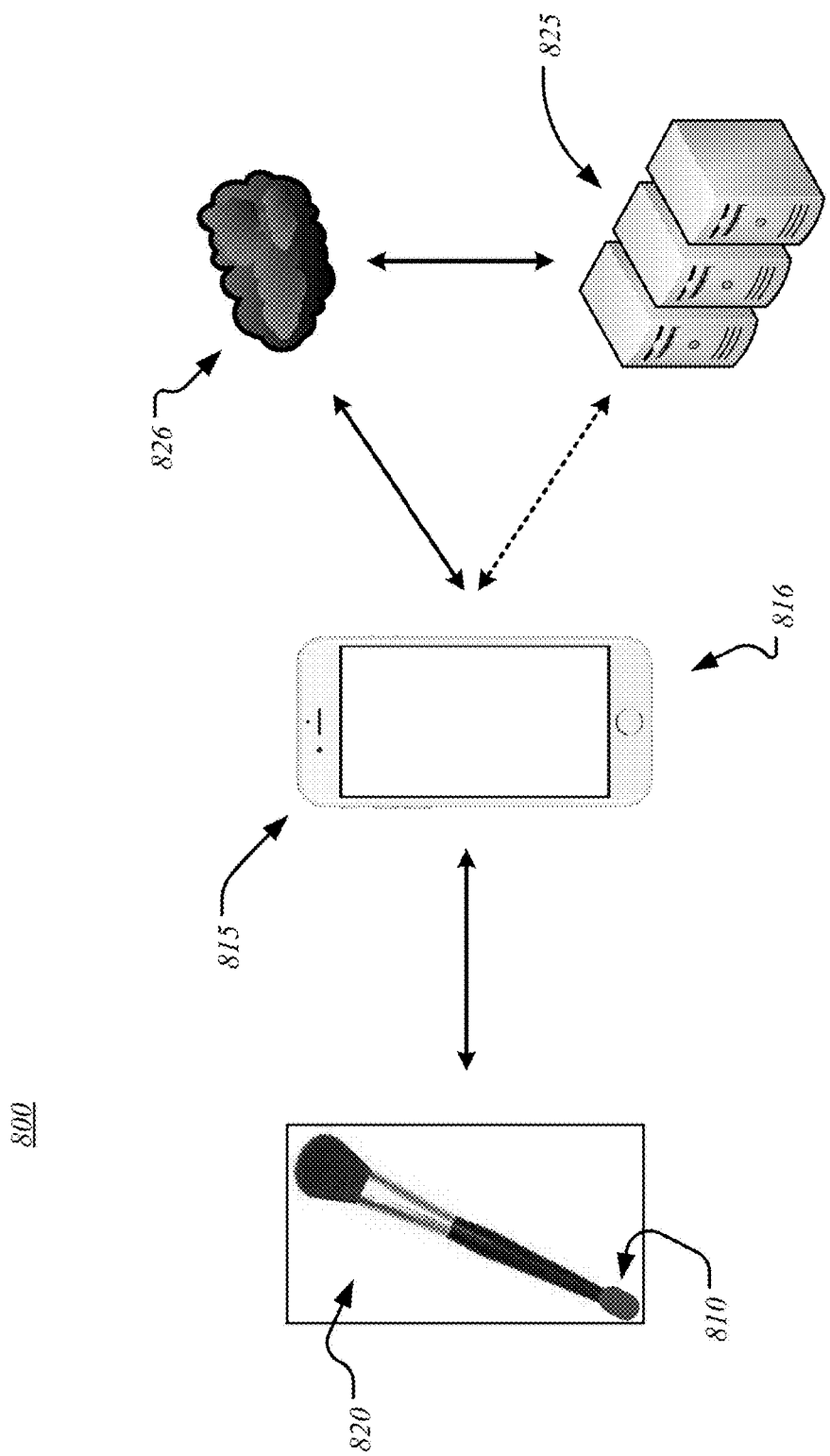
FIG. 8C illustrates the relationship between an implement, a client device, and a cloud-based computing system including external serves and Internet, according to an exemplary embodiment of the present disclosure.

FIG. 8C is a schematic illustrating the relationship between a cosmetic implement, client device, and cloud-based computing system including external serves and internet, according to an exemplary embodiment of the present disclosure. In an embodiment, the cosmetic implement is a brush 820. The schematic includes an exemplary system 800 of a cosmetic application training tool. The system 800 includes at least a brush 820 and a client device 815, or a smartphone 816, according to an embodiment. The brush 820 is further coupled to a trackable sleeve 810 for wireless communication. The system 800 may further include one or more external servers 825 which are implemented as part of a cloud-computing environment and in communication with the system 800 through the Internet 826. The one or more external servers 825 can store user data, including product data related to cosmetic brush brand, cosmetic brush type, cosmetic brush use and cosmetic color palette, as well as protocols and routines, tutorials, and other 3$^{rd}$ party services as integrated. Following completion of a training module, information related to available products from preferred brands may be displayed to the user via the user interface.

Further, the user interface or the client device can display tutorials on fundamentals of makeup application. The user interface can create and download protocols for a regimen or routine. The user interface can train, track usage and compare the tracked usage to the protocol, the regimen, and the routine. The user interface can calculate a score based on the tracked usage. The user interface can store the scores and the tracked usage of the training software in the memory of the client device. Moreover, the user interface can be used to make a purchase of any products related to the makeup products registered within the client device software application as well as recommendations of color tones, product lines, and other products related to the current training technique or future experimental training techniques.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system, comprising:
    a cosmetic apparatus configured to sense at least a motion of a cosmetic implement during application of a cosmetic substance to a skin surface of a user; and
    a client device having processing circuitry configured to
        receive sensory information transmitted wirelessly from the cosmetic apparatus regarding the sensed motion of the cosmetic implement,
        acquire guidance information corresponding to the received sensory information regarding the sensed motion, and
        control output of information, based on the sensed motion, to the user, the information output to the user being guidance information on usage of the cosmetic implement to achieve a desired result of the application of the cosmetic substance to the skin surface of the user, wherein the guidance information includes at least one of image data, video data, audio data, and haptic data.

2. The system according to claim 1, wherein the client device is further configured to
    receive input information from the user regarding the desired result using the cosmetic implement, and
    to output guidance information on usage of the cosmetic implement to achieve the desired result.

3. The system according to claim 1, wherein the guidance information is based on sensed motions for a single continuous session of usage of the cosmetic implement, multiple sessions of usage of the cosmetic implement, or a combination thereof.

4. The system according to claim 2, wherein the input information from the user is a selection of an image from a database.

5. The system according to claim 2, wherein the input information from the user is in response to a prompt from the client device.

6. The system according to claim 2, wherein the input information from the user is based upon user evaluation of an augmented reality of the desired result.

7. The system according to claim 1, wherein the client device, via the processing circuitry, is configured to actuate a discovery protocol that causes the client device and the cosmetic apparatus to identify each other and to negotiate one or more pre-shared keys, and wherein the cosmetic apparatus and the client device are configured to exchange encrypted and anonymized information using the pre-shared keys.

8. The system according to claim 1, wherein the client device, via the processing circuitry, is configured to actuate a validation protocol that causes the client device and the cosmetic apparatus to identify each other and to negotiate one or more pre-shared keys, and wherein the cosmetic apparatus and the client device are configured to exchange encrypted and anonymized information using the pre-shared keys.

9. A method implemented by a system that includes a cosmetic apparatus and a client device, the method comprising:
    sensing, by the cosmetic apparatus, at least a motion of a cosmetic implement during application of a cosmetic substance to a skin surface of a user;
    receiving, by the client device, sensory information transmitted wirelessly from the cosmetic apparatus regarding the sensed motion of the cosmetic implement;
    acquiring, by the client device, guidance information corresponding to the received sensory information regarding the sensed motion; and
    controlling, by the client device, output of information, based on the sensed motion, to the user, the information output to the user being guidance information on usage of the cosmetic implement to achieve a desired result of the application of the cosmetic substance to the skin surface of the user, wherein the guidance information includes at least one of image data, video data, audio data, and haptic data.

10. The method according to claim 9, wherein the client device receives input information from the user regarding the desired result using the cosmetic implement, and outputs guidance information on usage of the cosmetic implement to achieve the desired result.

11. The method according to claim 10, wherein the guidance information is based on sensed motions for a single continuous session of usage of the cosmetic implement, multiple sessions of usage of the cosmetic implement, or a combination thereof.

12. The method according to claim 10, wherein the input information from the user is a selection of an image from a database.

13. The method according to claim 10, wherein the input information from the user is in response to a prompt from the client device.

14. The method according to claim 10, wherein the input information from the user is based upon user evaluation of an augmented reality of the desired result.

15. The method according to claim 9, wherein the client device actuates a discovery protocol that causes the client device and the cosmetic apparatus to identify each other and to negotiate one or more pre-shared keys, and wherein the cosmetic apparatus and the client device are configured to exchange encrypted and anonymized information using the pre-shared keys.

16. The method according to claim 9, wherein the client device actuates a validation protocol that causes the client device and the cosmetic apparatus to identify each other and to negotiate one or more pre-shared keys, and wherein the cosmetic apparatus and the client device are configured to exchange encrypted and anonymized information using the pre-shared keys.

\* \* \* \* \*